US011518295B2

(12) United States Patent
Lawler et al.

(10) Patent No.: US 11,518,295 B2
(45) Date of Patent: Dec. 6, 2022

(54) TRACTION ASSIST APPARATUS AND METHOD FOR A WORK MACHINE

(71) Applicant: DEERE & COMPANY, Moline, IL (US)

(72) Inventors: Richard J Lawler, Dubuque, IA (US); Bryon P Neumann, Brantford (CA)

(73) Assignee: Deere & Company, Moline, IL (US)

( * ) Notice: Subject to any disclaimer, the term of this patent is extended or adjusted under 35 U.S.C. 154(b) by 583 days.

(21) Appl. No.: 16/592,019

(22) Filed: Oct. 3, 2019

(65) Prior Publication Data

US 2021/0101517 A1 Apr. 8, 2021

(51) Int. Cl.
| | |
|---|---|
| *B60P 1/14* | (2006.01) |
| *B60P 1/22* | (2006.01) |
| *B66C 21/02* | (2006.01) |
| *B60P 3/40* | (2006.01) |
| *B66D 1/30* | (2006.01) |
| *A01G 23/00* | (2006.01) |

(52) U.S. Cl.
CPC .............. *B60P 3/40* (2013.01); *A01G 23/006* (2013.01); *B66D 1/30* (2013.01)

(58) Field of Classification Search
CPC ...... B60P 1/14; B60P 1/22; B60P 3/40; B66C 21/02

USPC .......................................................... 280/480
See application file for complete search history.

(56) References Cited

U.S. PATENT DOCUMENTS

| | | | | |
|---|---|---|---|---|
| 3,956,835 | A * | 5/1976 | Evenson | E02F 9/2016 172/438 |
| 3,976,210 | A * | 8/1976 | Allen | B66D 1/36 414/559 |
| 4,365,927 | A * | 12/1982 | Schenck | B66C 23/54 180/41 |
| 4,635,953 | A * | 1/1987 | Robertson | B60D 1/185 280/480 |
| 5,215,325 | A * | 6/1993 | Novotny | B60D 1/185 280/480.1 |
| 7,165,758 | B2 * | 1/2007 | Kanzler | E01H 4/02 37/219 |
| 11,267,300 | B2 * | 3/2022 | Lawler | B62D 49/08 |
| 2019/0168551 | A1 | 6/2019 | Krume | |

* cited by examiner

*Primary Examiner* — Douglas A Hess

(57) ABSTRACT

A work machine extending in a fore-aft direction includes a frame, a ground-engaging mechanism, a boom assembly to the frame, and a traction assist apparatus. The ground-engaging mechanism is configured to support the frame on a surface. The traction assist apparatus is coupled to the boom assembly. The traction assist apparatus has an attachment point for securing a tether.

11 Claims, 8 Drawing Sheets

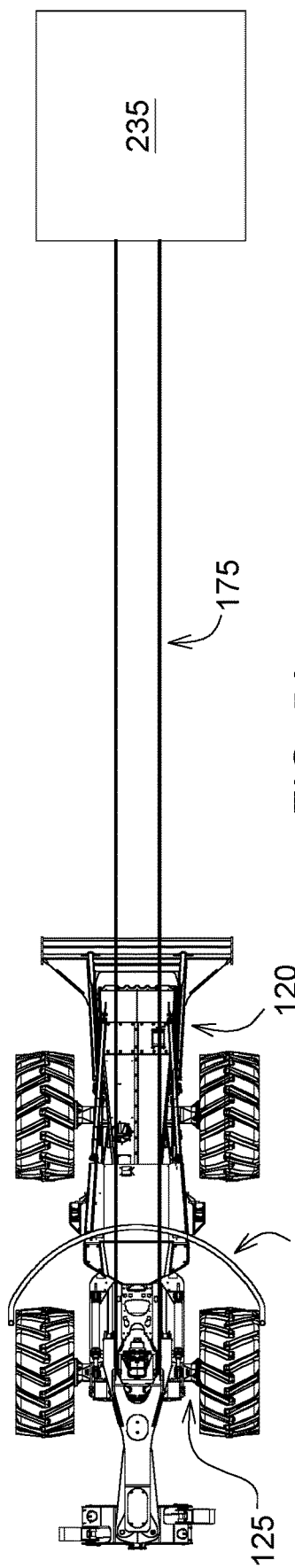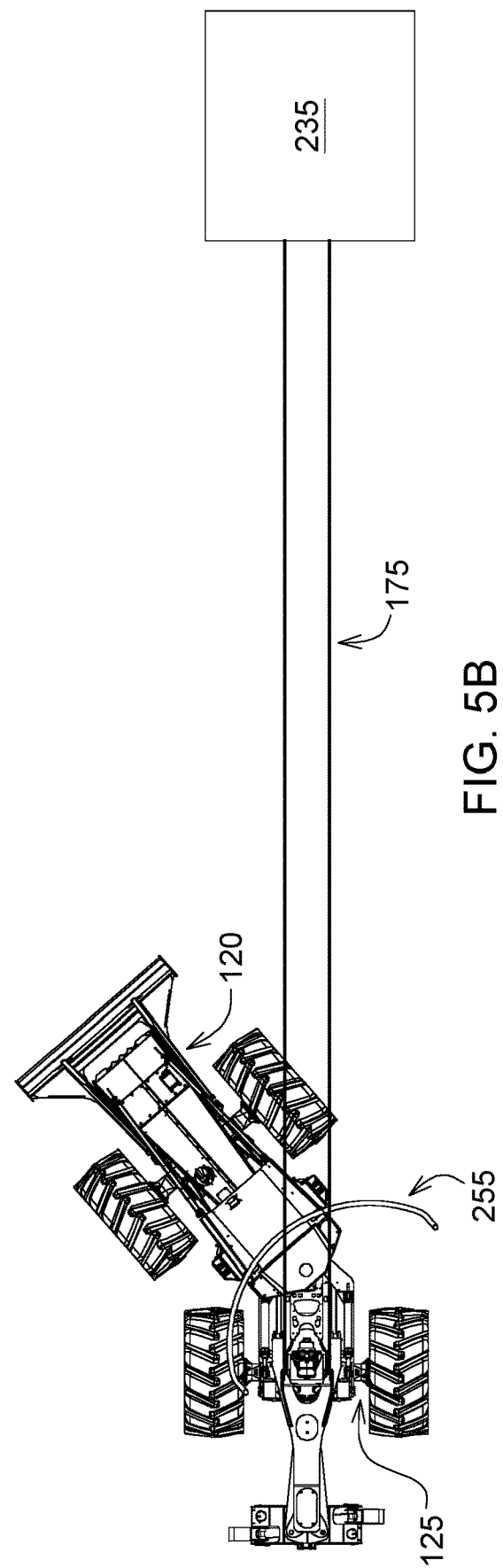

TRACTION ASSIST APPARATUS AND METHOD FOR A WORK MACHINE

CROSS-REFERENCE TO RELATED APPLICATIONS

N/A

FIELD OF THE DISCLOSURE

The present disclosure relates to a traction assist apparatus and method for a work machine.

BACKGROUND

Work machines operate in harsh environments and often include large inclines and varied surfaces (e.g. sheet rock, quarries, slippery surfaces, loose gravel, to name a few). These extreme operating conditions can at times create a need for coupling to an external anchor, such as a winch or another work machine to access certain areas. For example, a grapple skidder may need to pull a payload uphill consisting of tree logs to a processing site after being harvested from a deep valley.

One of the problems with work machines is a reduction in traction when working in such raw conditions. The raw conditions, when extreme, may make it challenging to maintain control and possibly moving the payload to its intended destination in a quick and efficient manner. Therein lies an opportunity to improve the work machines ability to perform.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The work machine comprises of a frame and a ground-engaging mechanism wherein the ground-engaging mechanism is configured to support the frame on a surface. The work machine also includes a boom assembly coupled to the frame, and a traction assist apparatus coupled to the boom assembly. The traction assist apparatus may have an attachment point for securing a tether.

The boom assembly may comprise a first section pivotally coupled to the frame moveable relative to the frame by a first actuator, and a second section pivotally coupled to the first section and moveable relative to the first section by a second actuator. In one embodiment, the traction assist apparatus may be coupled to the second section of the boom assembly.

The traction assist apparatus may comprise a first portion projecting upwards from the second section of the boom assembly. The first portion may have a first attachment point for securing the tether. The first attachment point may comprise a plurality of aperture, wherein a first aperture from the plurality of apertures aligned vertically above a second aperture from the plurality of apertures.

The first portion may further comprise a first projection, a second projection, and an intermediate support projection between the first projection and the second projection.

The traction assist apparatus may further comprise a tether support structure coupled to an operator cab of the work machine. In one embodiment, the tether support structure may comprise an arched pipe assembly that extending upwards above a top surface of the operator cab.

The traction assist apparatus may further comprise a second portion coupled to an aft portion of the second section of the boom assembly. The second portion may have a second attachment point for securing a tether. The second attachment point may be positioned proximal to the aft portion of the second section of the boom assembly. The second attachment point may comprise a plurality of apertures, wherein a first aperture from the plurality of apertures is aligned horizontally from a second aperture from the plurality of apertures. The work machine may further comprise a grapple coupled to the boom assembly, wherein the second attachment point of the traction assist apparatus is positioned above the grapple.

According to an aspect of the present disclosure, a method of traction assist for a work machine is a presented. In a first step, a tether is provided. Then a tether is attached to an attachment point on a traction assist apparatus. The traction assist apparatus may be coupled to the boom assembly on the work machine. The traction assist apparatus may comprise a first portion projecting upwards from an aft section of the boom assembly, a second portion extending in an aft direction from the boom assembly, and a tether support structure coupled to an operator cab of the work machine.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 5A is a top view of a traction assist apparatus coupled to the work machine shown in FIG. 1 in an uphill operation;

FIG. 5B is a top view of a traction assist apparatus coupled to the work machine shown in FIG. 1 in an uphill operation with the vehicle turned;

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
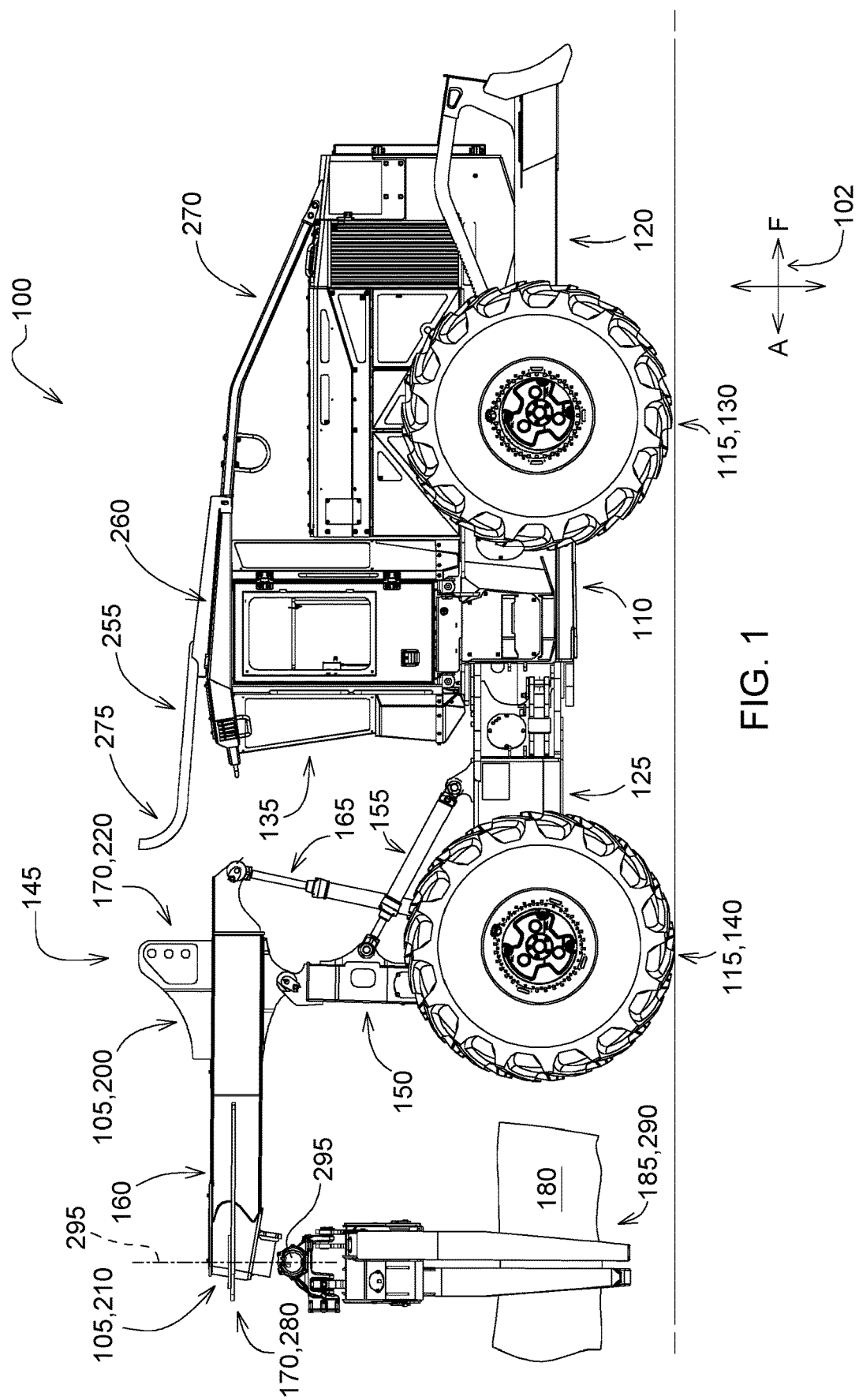
FIG. 1 is a side view of a traction assist apparatus coupled to a work machine according to a first embodiment.
Figure 2A:
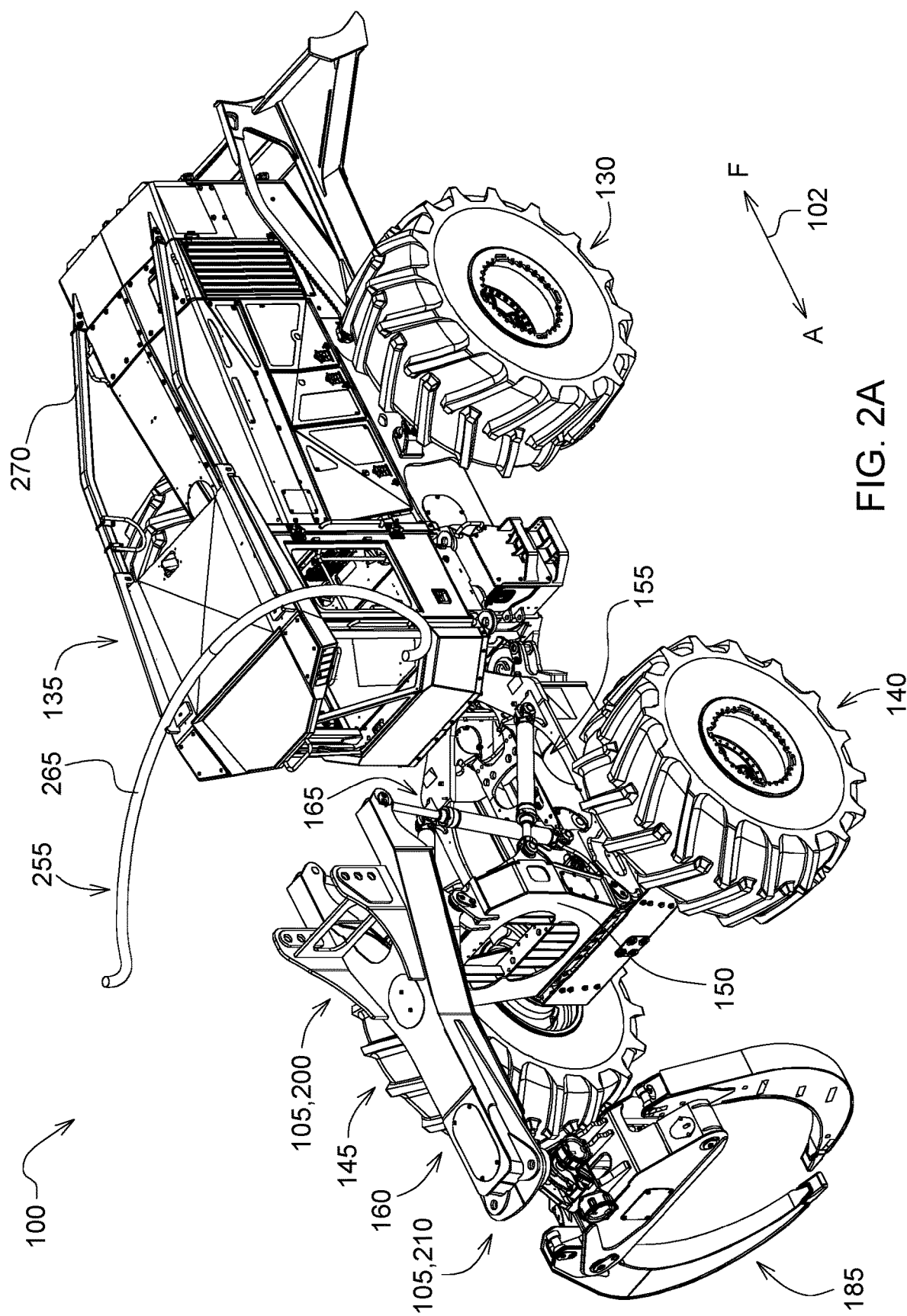
FIG. 2A is a perspective view of the traction assist apparatus coupled to a work machine according to the embodiment shown in FIG. 1.
Figure 3:
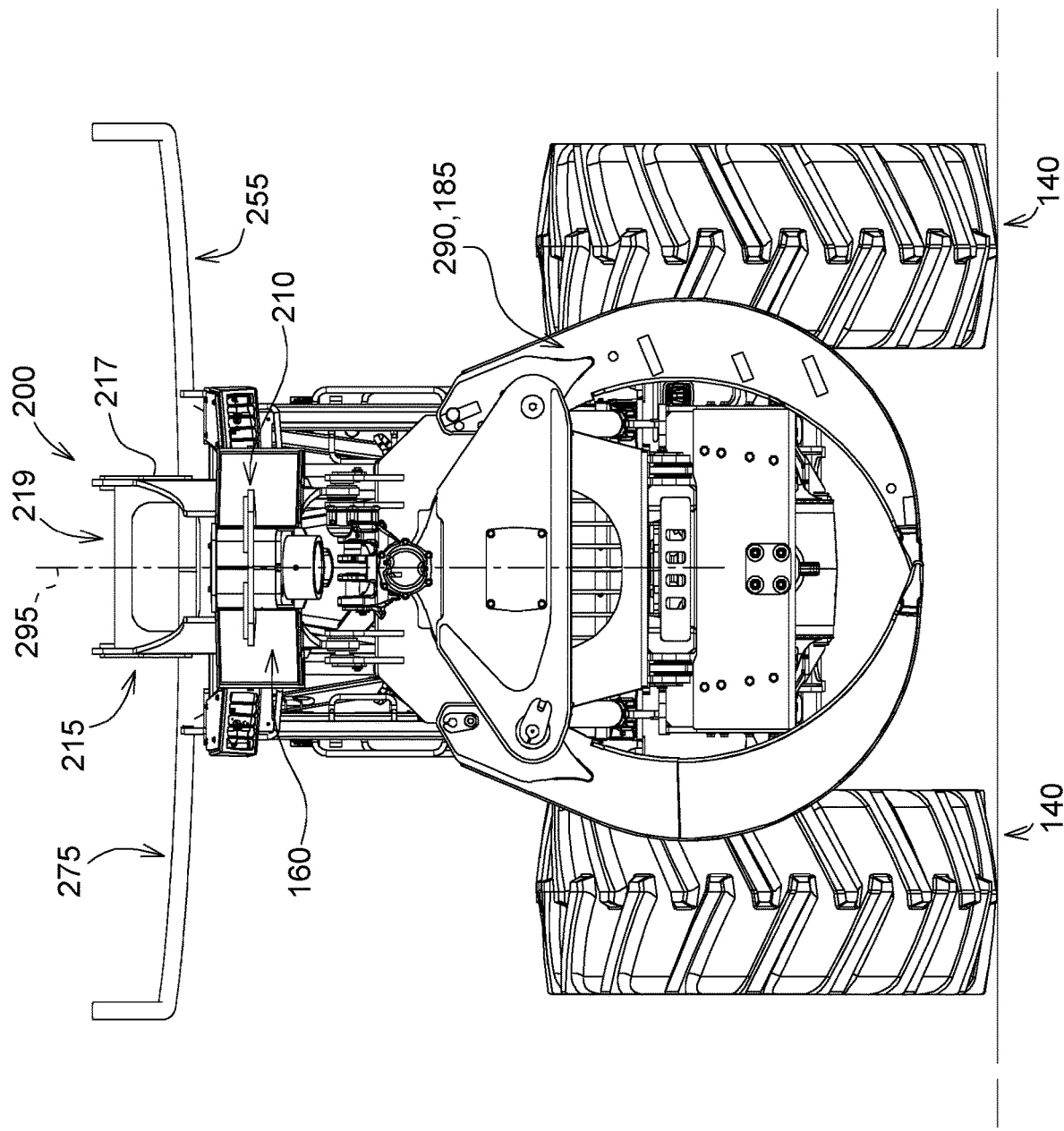
FIG. 3 is a back view of the of the traction assist apparatus coupled to a work machine according to the embodiment shown in FIG. 1.

FIGS. 1, 2A, and 3 illustrate a work machine 100 with a traction assist apparatus 105. In the present embodiment for use of traction assist apparatus 105 with a work machine 100, a grapple skidder is shown. Grapple skidders may be used to transport harvested trees over natural grounds such as a forest. Please note that while the figures and descriptions may relate to a four-wheeled grapple skidder in this first exemplary embodiment, it is to be understood that the scope of the present disclosure extends beyond a four-wheeled grapple skidder and applies to other alternative work machines with a boom assembly that move large payloads in slippery sloped conditions. The term "work machine" is intended to be broader and encompass other work machines besides a grapple skidder. Other examples asides from four-wheeled grapple skidders, may include six-wheeled grapple skidders, loaders, skid steers, feller bunchers, or some other work machine. The term "work machine" or "vehicle" may also be used interchangeably.

The work machine 100, extending in a fore-aft direction 102 (also indicated by F and A) comprises a frame 110 and a ground-engaging mechanism 115, such as wheels or tracks. In the present embodiment, the frame 110 comprises a front vehicle frame 120 coupled to a rear vehicle frame 125. Front wheels 130 support the front vehicle frame 120, and the front vehicle frame 120 supports an engine compartment (not shown) and operator cab 135. Rear wheels 140 support the rear vehicle frame 125, and the rear vehicle frame 125 supports a boom assembly 145. Although the ground-engaging mechanism 115 is described as wheels in this embodiment, in an alternative embodiment, tracks or combination of wheels and tracks may be used. The engine compartment houses a vehicle engine or motor, such as a diesel engine which provides the motive power for driving the front wheels 130 and rear wheels 140 and for operating the other components associated with the grapple skidder such as the actuators to move the boom assembly 145. The operator cab 135, where an operator sits when operating the work machine, includes a plurality of controls (e.g. joysticks, pedals, buttons, levers, display screens, etc.) for controlling the work machine 100 during operation thereof.

The boom assembly 145 is coupled to the frame 110. In the present embodiment disclosed herein, the frame 110 is noted as the rear vehicle frame 125, for simplicity. However, in work machines with a single frame, the frame would apply to the single frame. The boom assembly 145 comprises a first section 150 (i.e. arch section) pivotally coupled to the frame 110 and moveable relative to the frame 110 by a first actuator 155. The boom assembly 145 further comprises a second section 160 (i.e. the boom section) pivotally coupled to the first section 150 and moveable relative to the first section 150 by a second actuator 165. A traction assist apparatus 105 is coupled to the boom assembly 145 wherein the traction assist apparatus 105 comprises an attachment point 170 for securing a tether 175. Coupling of the traction assist apparatus 105 to the boom assembly 145 places the attachment point 170 in proximity to the payload 180 being held by an attachment 185 (e.g. a grapple) of the work machine 100, thereby allowing improved control of the work machine as discussed in further detail below. Furthermore, in the present embodiment of a grapple skidder, placement of the attachment point 170 on the boom assembly 145 ensures the front vehicle frame 120 does not perceive a direct load from pulling the tether 175.

Figure 2B:
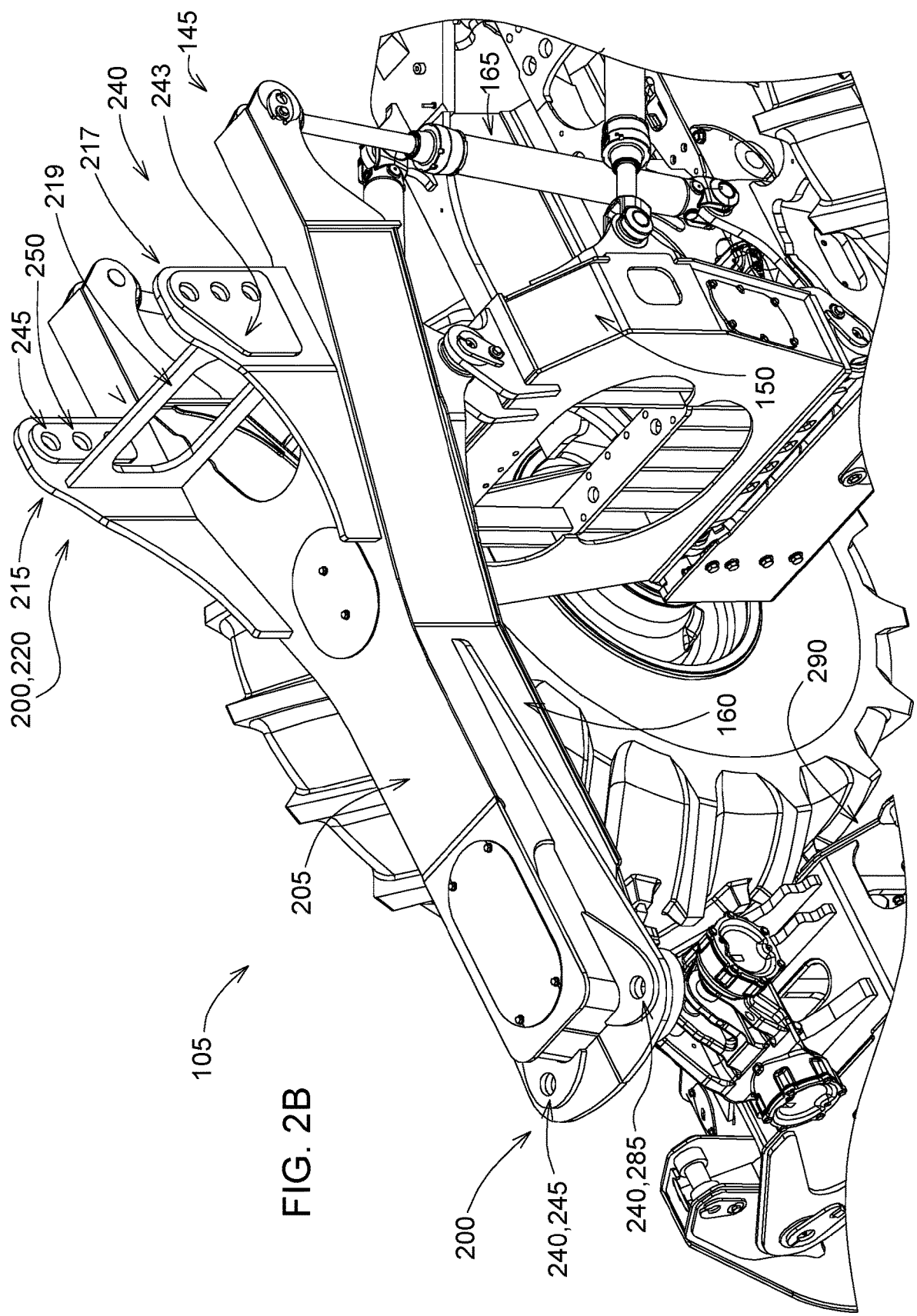
FIG. 2B is a detailed perspective view of the traction assist apparatus shown in FIG. 2A.

A detailed view of the traction assist apparatus 105 coupled to the first exemplary embodiment is shown in FIG. 2B. The traction assist apparatus 105 may comprise of a first portion 200 projecting upwards from the second section 160 of the boom assembly 145. This first portion 200 may be positioned towards the operator cab 135, in a fore portion of the second section 160 of the boom assembly 145. In particular, the first portion 200 of the traction assist apparatus 105 may project past the top surface 205 of the second section 160 of the boom assembly 145. The first portion 200 may comprise a first projection 215, a second projection 217, and an intermediate support 219 between the first projection 215 and the second projection 217.

Figure 4:
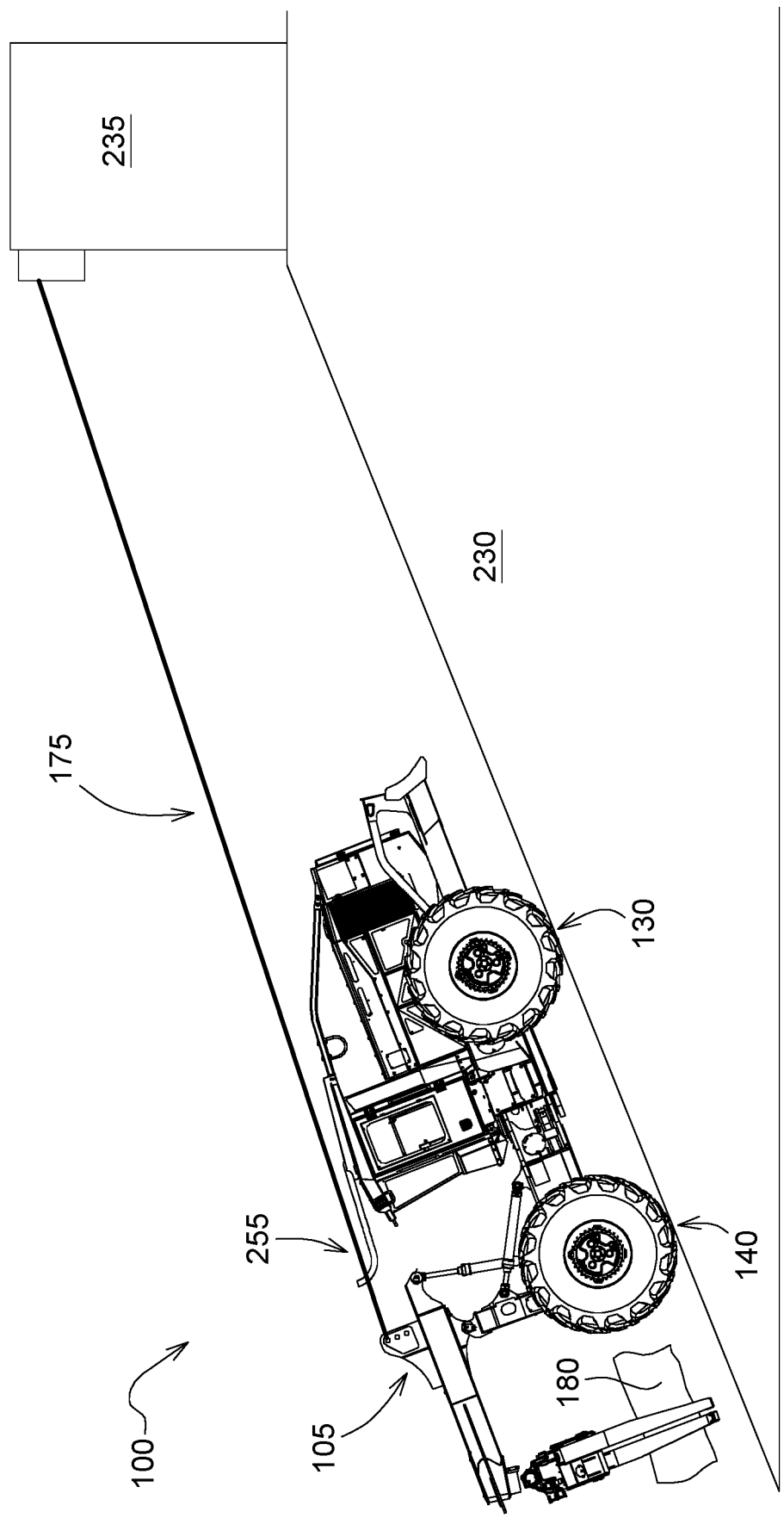
FIG. 4 is a side view of a traction assist apparatus coupled to the work machine shown in FIG. 1 in an uphill operation.

The first portion 200 may comprise a first attachment point 220 for securing a tether 175. Projecting the first portion 200 past the top surface 205 of the second section 160 of the boom assembly 145, in an upwards direction, enables the tether 175 to straddle over a top surface of the operator cab 135. In uphill applications (as shown in FIG. 4), where the work machine 100 is traction assisted in moving the work machine up a slope, this configuration enables a downward moment arm by the tether 175 on the work machine, aiding in maintaining engagement of the front wheels 130 with the ground surface 230. This aids the work machine 100 in powering itself up the slope and does not rely strictly on the winch 235 for movement. Furthermore, engagement of the front wheels 130 with the ground surface 230 improves the operator's ability to maneuver the work machine 100, and control steering. In one exemplary standard configuration available today, a traction assist apparatus may be coupled at or near a base of a work machine, specifically the bucket, often resulting in an unintended lift off either the front wheels or the rear wheels from the ground surface when pulled in sloped environments.

Although the first attachment point 220 may be of various configurations, in its most simplistic form, the first attachment point 220 may comprise a plurality of apertures 240. The plurality of apertures 240 enable a clamp, a c-ring, a hook, or some other attachment device to couple a tether 175 to the traction assist apparatus 105. The plurality of apertures 240 may further comprise reinforcement plates 243 for strength. In one instance, a first aperture 245 from the plurality of apertures 240 may be aligned vertically above a second aperture 250 from the plurality of apertures 240. Although a series of three apertures is shown, four or more apertures, or less than three apertures may also be applied. For the first portion 200 of the traction assist apparatus 105, the plurality of apertures 240 may traverse through both the first projection 215 and the second projection 217, thereby distributing the load symmetrically across the width of second section 160 of the boom assembly 145. The first attachment 220 point enables an operator to choose a relative height of engagement of a tether 175 from the top surface 205 of the boom assembly 145 depending on the environmental conditions (e.g. slope, ground surface conditions, etc) and/or force required for assisting traction.

The traction assist apparatus 105 may further comprise a tether support structure 255 coupled to the operator cab 135 of the work machine 100. More specifically, in the embodiment shown, the traction support structure 255 may engage with a support frame 260 on a top surface of the operator cab 135. In the exemplary embodiment shown, the support frame 260 may comprise of two parallel rails welded to a top surface of the operator cab 135. Each rail may have a recess 265 for coupling the tether support structure 255. The rails with recess 265 provide support, securing the tether support structure 255 to the operator cab 135 and may help maintain the orientation of the tether support structure 255 relative to the operator cab 135. In an alternative embodiment, the tether support structure 255 may engage with one or more limb risers 270 coupled to the operator cab 135. The tether support structure 255 may comprise an arched pipe assembly 275 extending upwards above a top surface of the operator cab 135. Applicable in uphill operations, the tether support structure 255 ensures the tether 175 does not drop in between the front vehicle frame 120 and the rear vehicle frame 125 when not in tension. It further provides a smooth surface for the tether to slip over when in use to minimize wear to the tether 175. Additionally, the tether support structure 255 may span beyond the cross-width of the operator cab 160, thereby remaining functional as the work machine turns (shown in FIG. 5B).

Figure 6:
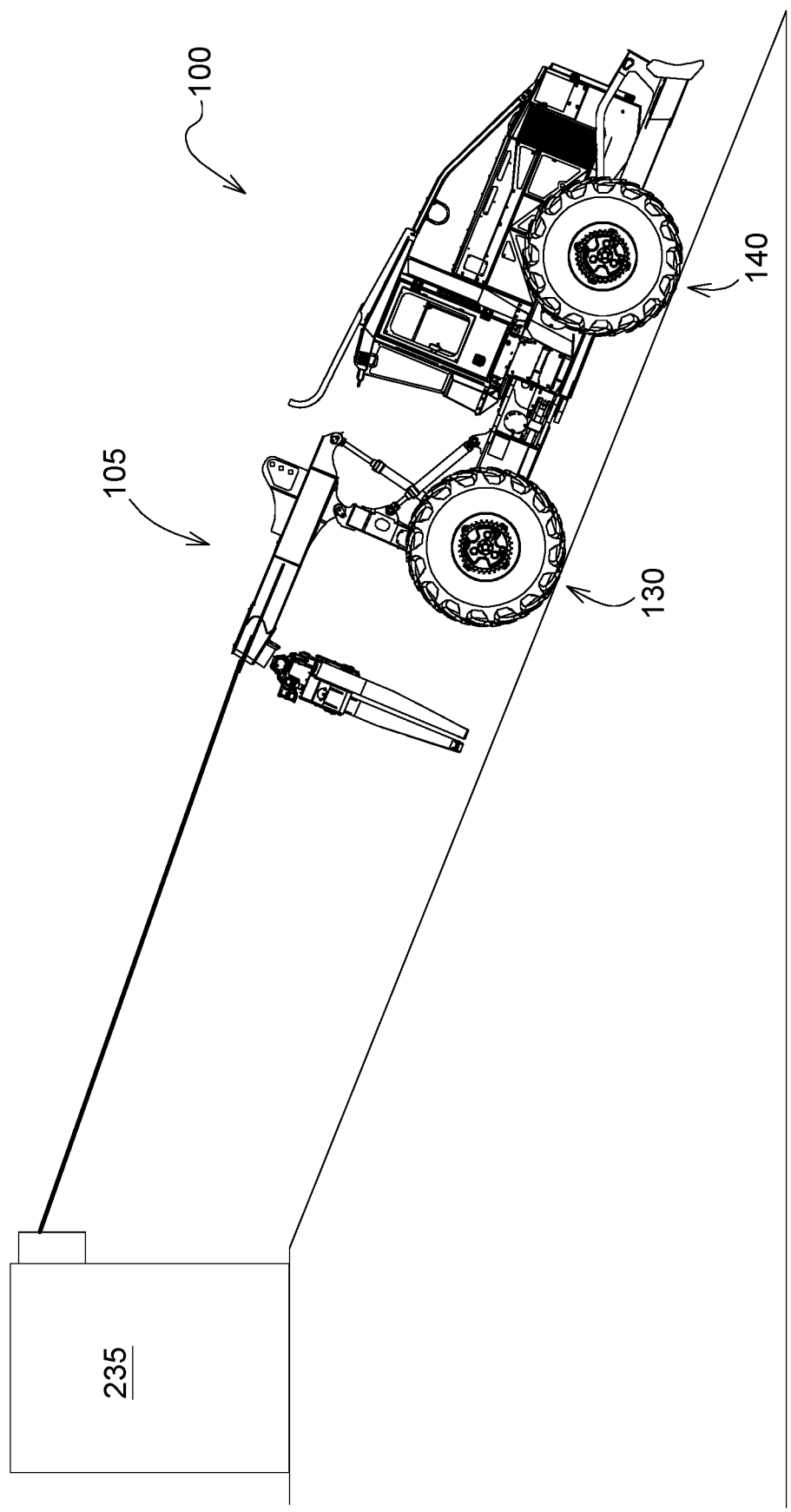
FIG. 6 is a side view of a traction assist apparatus coupled to the work machine shown in FIG. 1 in a downhill operation.
Figure 7:
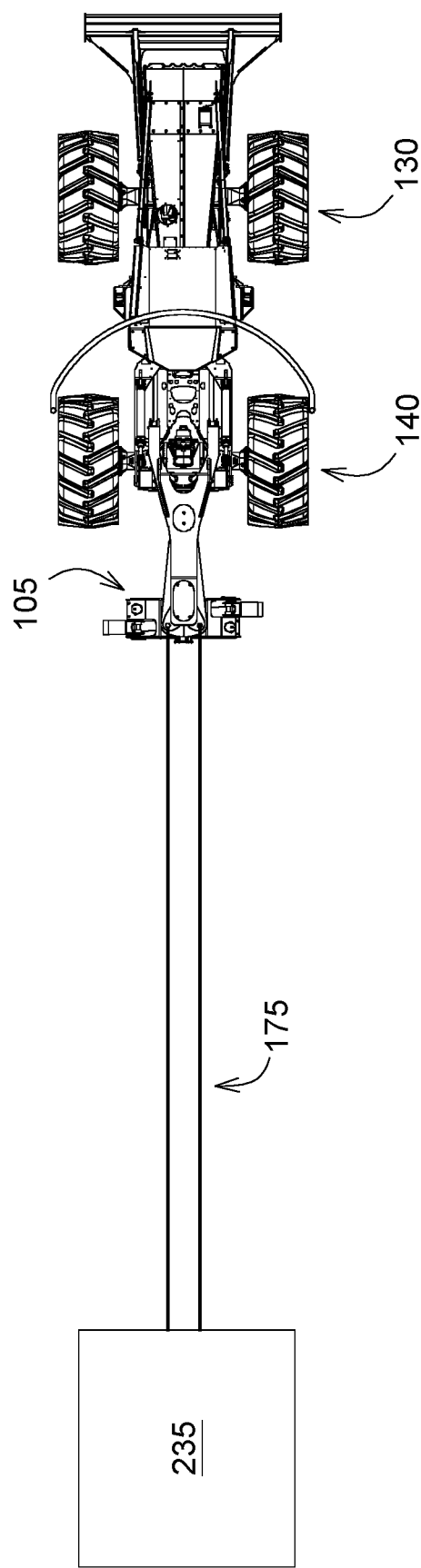
FIG. 7 is a side view of a traction assist apparatus coupled to the work machine shown in FIG. 1 in a downhill operation.

The traction assist apparatus 105 may further comprise a second portion 210 coupled to an aft portion of the second section 160 of the boom assembly 145. The second portion 210 may be particularly useful in downhill applications. This second portion 210 may have a second attachment point 280 for securing a tether 175 positioned close to the aft portion of the second section 160 of the boom assembly 145. The second attachment point 280 may comprise a plurality of apertures 240, wherein a first aperture 245 from the plurality of apertures 240 is aligned horizontally from a second aperture 285 from the plurality of apertures 240. The second attachment point 280 may further be positioned above the grapple 290, or as shown, substantially proximal to the central axis 295 of the grapple 290. FIGS. 6 and 7 demonstrate the use of the traction assist apparatus 105, or more specifically the second portion 210 of the traction assist apparatus in a downhill application.

Figure 8:
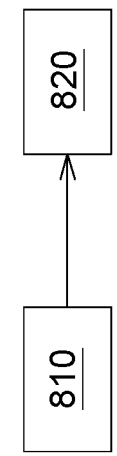
FIG. 8 is a method of traction assist for a work machine using the traction assist apparatus.

FIG. 8 demonstrates a method of traction assist for a work machine 800. The method includes a first step 810 of providing a tether 175. The tether 175 may be coupled to a winch 235 or alternatively another work machine 100. The next step 820 includes attaching the tether 175 to an attachment point 170 on a traction assist apparatus 105 wherein the traction assist apparatus is coupled to the boom assembly 160 on the work machine 100. The traction assist apparatus 105 may comprise a first portion 200, as previously described, to assist in ascending uphill. The traction assist apparatus 105 may also comprise a second portion 210, as previously described, in descending downhill. Finally, a tether support structure 255 may be coupled to the operator cab 135 of the work machine 100, the tether support structure "catching" the tether when relaxed, preventing it from falling towards the ground-engaging mechanisms.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A work machine extending in a fore-aft direction, the work machine comprising:
    a frame and a ground-engaging mechanism, the ground-engaging mechanism configured to support the frame on a surface;
    a boom assembly coupled to the frame; and
    a traction assist apparatus coupled to the boom assembly, the traction assist apparatus having an attachment point for securing a tether;
    wherein the boom assembly comprises a first section pivotally coupled to the frame and moveable relative to the frame by a first actuator, and a second section pivotally coupled to the first section and moveable relative to the first section by a second actuator, the traction assist apparatus coupled to the second section of the boom assembly,
    wherein the traction assist apparatus comprises a first portion projecting upwards from the second section of the boom assembly, the first portion having a first attachment point for securing the tether, the first attachment point comprising a plurality of apertures, and wherein a first aperture from the plurality of apertures is aligned vertically above a second aperture from the plurality of apertures.

2. A work machine extending in a fore-aft direction, the work machine comprising:
    a frame and a ground-engaging mechanism, the ground-engaging mechanism configured to support the frame on a surface;
    a boom assembly coupled to the frame; and
    a traction assist apparatus coupled to the boom assembly, the traction assist apparatus having an attachment point for securing a tether;
    wherein the boom assembly comprises a first section pivotally coupled to the frame and moveable relative to the frame by a first actuator, and a second section pivotally coupled to the first section and moveable relative to the first section by a second actuator, the traction assist apparatus coupled to the second section of the boom assembly
    wherein the traction assist apparatus comprises a first portion projecting upwards from the second section of the boom assembly, the first portion having a first attachment point for securing the tether, and
    wherein the first portion comprises a first projection, a second projection, and an intermediate support projection between the first projection and the second projection.

3. A work machine extending in a fore-aft direction, the work machine comprising:

a frame and a ground-engaging mechanism, the ground-engaging mechanism configured to support the frame on a surface;

a boom assembly coupled to the frame; and a traction assist apparatus coupled to the boom assembly, the traction assist apparatus having an attachment point for securing a tether;

wherein the boom assembly comprises a first section pivotally coupled to the frame and moveable relative to the frame by a first actuator, and a second section pivotally coupled to the first section and moveable relative to the first section by a second actuator, the traction assist apparatus coupled to the second section of the boom assembly, and a tether support structure coupled to an operator cab of the work machine, wherein the tether support structure comprises an arched pipe assembly extending upwards above a top surface of the operator cab.

4. A work machine extending in a fore-aft direction, the work machine comprising:

a frame and a ground-engaging mechanism, the ground-engaging mechanism configured to support the frame on a surface;

a boom assembly coupled to the frame; and a traction assist apparatus coupled to the boom assembly, the traction assist apparatus having an attachment point for securing a tether;

wherein the boom assembly comprises a first section pivotally coupled to the frame and moveable relative to the frame by a first actuator, and a second section pivotally coupled to the first section and moveable relative to the first section by a second actuator, the traction assist apparatus coupled to the second section of the boom assembly;

wherein the traction assist apparatus comprises a second portion coupled to an aft portion of the second section of the boom assembly, the second portion having a second attachment point for securing a tether, the second attachment point positioned proximal to the aft portion of the second section of the boom assembly; and wherein the second attachment point comprises a plurality of apertures, wherein a first aperture from the plurality of apertures is aligned horizontally from a second aperture from the plurality of apertures.

5. The work machine of claim 4, further comprising a grapple coupled to the boom assembly, wherein the second attachment point is positioned above the grapple.

6. A traction assist apparatus for a work machine, the work machine extending in a fore-aft direction, the work machine including a frame, a ground-engaging mechanism and a boom assembly coupled to the frame, the ground-engaging mechanism configured to support the frame on a surface, the traction assist apparatus comprising:

a first portion coupled to the boom assembly of a work machine, the first portion projecting upwards from a fore section of the boom assembly and having an attachment point for securing a tether wherein the attachment point comprises a plurality of apertures, wherein a first aperture from the plurality of apertures is aligned vertically above a second aperture from the plurality of apertures.

7. A traction assist apparatus for a work machine, the work machine extending in a fore-aft direction, the work machine including a frame, a ground-engaging mechanism and a boom assembly coupled to the frame, the ground-engaging mechanism configured to support the frame on a surface, the traction assist apparatus comprising:

a first portion coupled to the boom assembly of a work machine, the first portion projecting upwards from a fore section of the boom assembly and having an attachment point for securing a tether wherein the first portion comprises a first projection, second projection, and an intermediate support projection between the first projection and the second projection.

8. The traction assist apparatus of claim 7 further comprising:

a tether support structure coupled to an operator cab of the work machine.

9. The traction assist apparatus of claim 8, wherein the tether support structure comprises an arched pipe assembly extending upwards above a top surface of the operator cab.

10. A traction assist apparatus for a work machine, the work machine extending in a fore-aft direction, the work machine including a frame, a ground-engaging mechanism and a boom assembly coupled to the frame, the ground-engaging mechanism configured to support the frame on a surface, the traction assist apparatus comprising:

a first portion coupled to the boom assembly of a work machine, the first portion projecting upwards from a fore section of the boom assembly and having an attachment point for securing a tether, a second portion in a direction from the boom assembly, the second portion having a second attachment point for securing a tether, the second attachment point positioned proximal to the aft portion of the second section of the boom assembly, wherein the second attachment point comprises a plurality of apertures, wherein a first aperture from the plurality of apertures is aligned horizontally from a second aperture from the plurality of apertures.

11. The traction assist apparatus of claim 10, wherein the second attachment point is positioned above a grapple, the grapple coupled to the boom assembly.

* * * * *